United States Patent

[15] 3,662,391

Brown

[45] May 9, 1972

[54] INSTRUMENT LANDING SYSTEM

[72] Inventor: William M. Brown, Ann Arbor, Mich.
[73] Assignee: Chain Lakes Research Corporation, Detroit, Mich.
[22] Filed: Oct. 20, 1969
[21] Appl. No.: 867,822

[52] U.S. Cl. .................343/112 A, 343/5 LS, 343/12 MD, 343/112 D
[51] Int. Cl. .................................................G01s 1/02
[58] Field of Search .................343/12 MD, 112 A, 112 D

[56] References Cited

UNITED STATES PATENTS

| | | | |
|---|---|---|---|
| 2,992,422 | 7/1961 | Hayes | 343/12 MD X |
| 3,195,136 | 7/1965 | Klein | 343/112 D |
| 3,289,204 | 11/1966 | Murray et al. | 343/12 MD X |
| 3,350,712 | 10/1967 | Stine et al. | 343/12 MD |

*Primary Examiner*—T. H. Tubbesing
*Attorney*—Barnard, McGlynn & Reising

[57] ABSTRACT

An instrument landing system for determining the altitude of an aircraft at a plurality of points along a glide path defined by a plurality of spaced transmitters located along a ground reference line and transmitting at a predetermined frequency, the aircraft receiver apparatus comprising means for producing a pulse pair for each transmitter point corresponding to a predetermined Doppler frequency shift which is realized first when converging on the transmitter point and second when diverging from the transmitter point and means for determining altitude as a function of velocity and the time elapsed between the pulses of the pair. Altitude deviation from the glide path is determined by a comparison of signals related to the distance between two succeeding transmitter points and the time spacing of a pulse pair.

4 Claims, 5 Drawing Figures

INSTRUMENT LANDING SYSTEM

This invention relates to a method and apparatus for determining the distance between two relatively moving points by the determination of angular relationships between a signal path and a reference plane using Doppler frequency shift principles.

The present invention is particularly applicable to the guidance of aircraft on the landing glide path just prior to touchdown. Such guidance requires precise knowledge of the altitude of the aircraft relative to the ground plane defined by the runway or an extension thereof. Such altitude information is provided in accordance with the present invention by the determination of two angles between the ground plane and respective signal transmission paths, and the distance between two spaced points intersected by the signal paths.

In general, the invention involves communicating continuous wave signals at selected frequencies between a first point and each of two spaced points, of known or determinable spacing and determining the angles between the two signal paths and a plane parallel to the spaced points. In a particular embodiment, the spaced points lie along the flight path of an aircraft and the first point is a signal transmitter at or near the ground plane.

The subject invention is particularly suited to aircraft altitude measurement at several spaced points along a glide path thereby to guide the aircraft in its approach to a landing. In general, this is accomplished by providing a plurality of transmitter points along a ground reference line and determining the altitude of the aircraft relative to each point by measurement of the time intervals between equal converging and diverging Doppler shift frequencies for each of the points.

In a preferred form, the invention permits an indication of the altitude deviation from a path having a desired altitude profile. In general, this is accomplished by placing a plurality of transmitter points at predetermined space locations along a ground reference line and comparing the actual elapsed time between equal Doppler shift frequency points for one transmitter location to a desired time calculated with reference to the spacing between the transmitter location and the previous transmitter location.

The method of altitude determination provided by the present invention lends itself to various implementations of various advantage, one such implementation being described in detail in the following specification and illustrated in the drawing of which:

Figure 1:
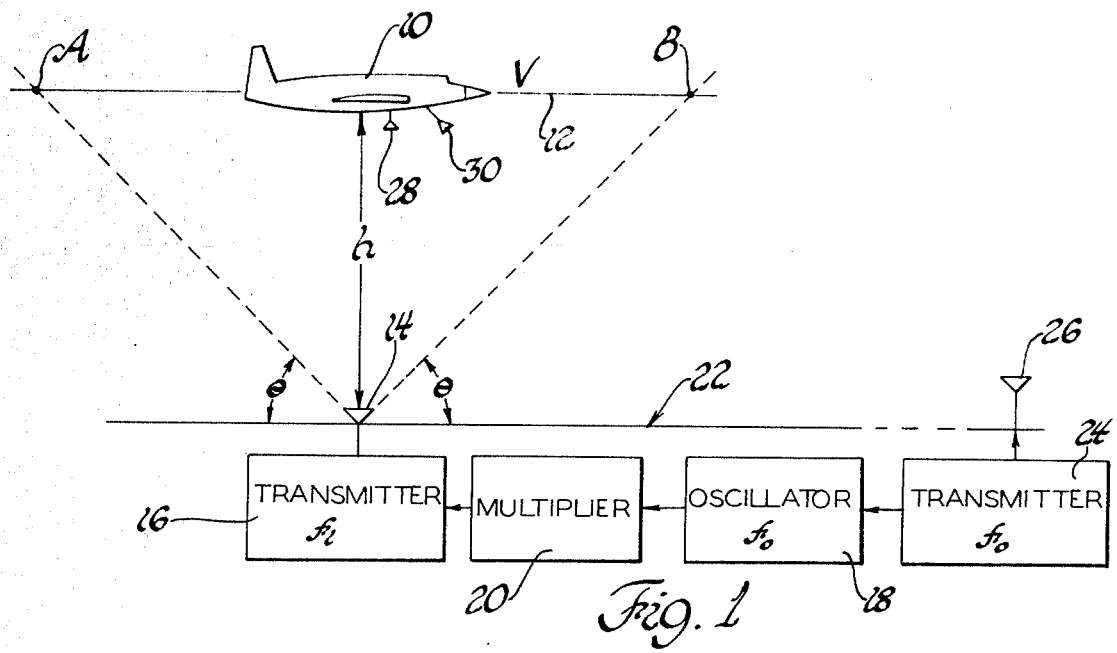
FIG. 1 is a schematic diagram of an illustrative embodiment of the invention.

Referring to FIG. 1 an aircraft 10 is shown to be moving at a rate V along a flight path 12 at an altitude $h$ relative to a ground based antenna 14. The antenna 14 is excited by a transmitter 16 to appear essentially as a point source radiating a continuous wave signal at a frequency $f_1$. This frequency is established by means of a base frequency oscillator 18 which is connected to the transmitter 16 through a frequency multiplier 20. Antenna 14 is disposed essentially at ground level 22.

Oscillator 18 is also connected to a second transmitter 24 which radiates a continuous wave signal at a base frequence $f_0$ by means of a transmitting antenna 26. As indicated in FIG. 1 the transmitter 24 and antenna 26 are separated from the antenna 14 and transmitter 16 by a relatively large distance; for example, antenna 26 may be disposed at the far end of a runway being approached by aircraft 10 and antenna 14 may be disposed approximately one-half mile from the near end of the runway.

Aircraft 10 is provided with receiver apparatus to be described in greater detail with reference to FIGS. 2 and 4, for receiving the signals from transmitters 16 and 24 through receiving antennas 28 and 30 respectively.

It will be observed by reference to FIG. 1 that the flight path 12 of the aircraft 10, being spaced from but passing over the antenna 14, causes aircraft 10 to converge upon the antenna 14 until the aircraft 10 is directly over the antenna 14 after which it diverges from the antenna 14. Aircraft 10 constantly converges upon the transmitting antenna 26. Accordingly, a positive Doppler frequency shift, i.e., an apparent frequency increase, in the signal received from antenna 14 is experienced while converging upon the antenna and a negative Doppler frequency shift, that is, an apparent frequency decrease, is experienced while diverging from the antenna 14. There are points or locations approximately equally spaced about the antenna 14 where absolute value of the Doppler frequency shifts experienced during convergence and divergence are equal. Accordingly, by selecting and detecting specific Doppler frequency shifts which occur at the interception of the aircraft with signal rays of known angularity relative to a reference line, and determining the time required to travel between two such points of interception, the altitude of the aircraft may be readily determined on the basis of the velocity of the aircraft.

Referring again to FIGS. 1 and 2 the line of flight 12 of the aircraft 10 is shown to intercept two projected signal rays each drawn at an angle $\theta$ with respect to a line parallel to the glide path at points A and B. Point A lies in the portion of the flight path during which the aircraft 10 is relatively converging upon the antenna 14 and the point B lies the portion of the flight path 12 which occurs while the aircraft is diverging from the antenna 14. For simplicity, $\theta$ is set equal to 45° such that the distance between A and B is $2h$. It will be understood, however that $\theta$ may be any angle within a wide range.

Figure 2:
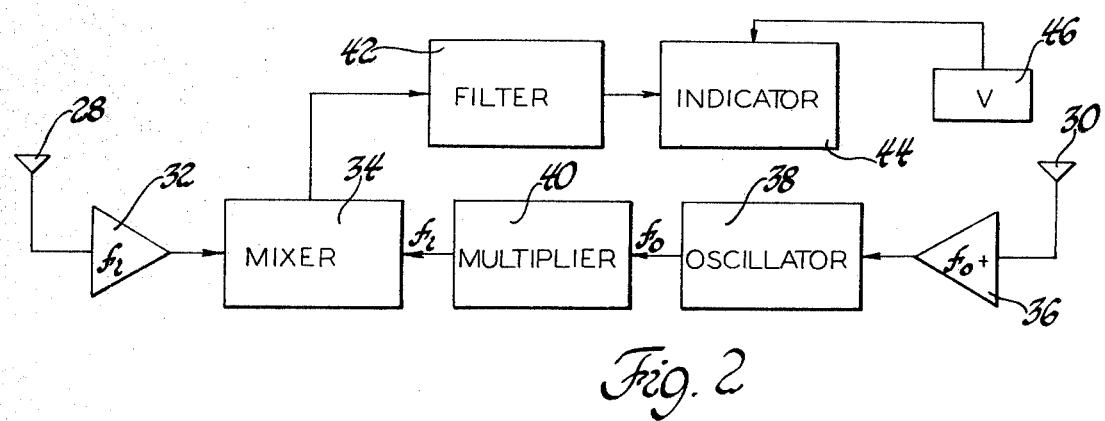
FIG. 2 is a block diagram of the aircraft receiver apparatus which operates in the system of FIG. 1.

FIG. 2 shows the antenna 28, which is directed toward and tuned to receive the signal from the antenna 14, connected through an amplifier stage 32 having a center frequency of slightly above $f_1$ to one input of a mixer circuit 34 of the type well known in the radio art. The second aircraft mounted antenna 30, which is directed toward and tuned to receive the $f_0$ signal from transmitting antenna 26, is connected through an amplifier stage 36 having a center frequency of slightly above $f_0$ to a locking oscillator 38. Oscillator 38 produces an output signal at a frequency of $f_0$, but increased slightly in frequency above $f_0$ due to relative convergence between the aircraft and the antenna 26. This signal is applied to the input of a frequency multiplier circuit which increases the frequency of the signal to $f_1$ plus a small Doppler factor and applies this signal to the second input of the mixer 34. Accordingly, the multiplier factor of the multiplier circuit 40 is identical with that of the ground base multiplier circuit 20 shown in FIG. 1. Mixer 34 operates to produce an output corresponding to the difference of the two input signal frequencies and the difference signal representing the Doppler frequency shift away from $f_1$ in the signal received by the aircraft antenna 28 is applied to the input of a narrow band filter circuit 42. Circuit 42 contains two filters which are tuned to provide an output only when the Doppler frequency shifts of the signal applied to the input thereof, equal a predetermined quantity.

Figure 5:
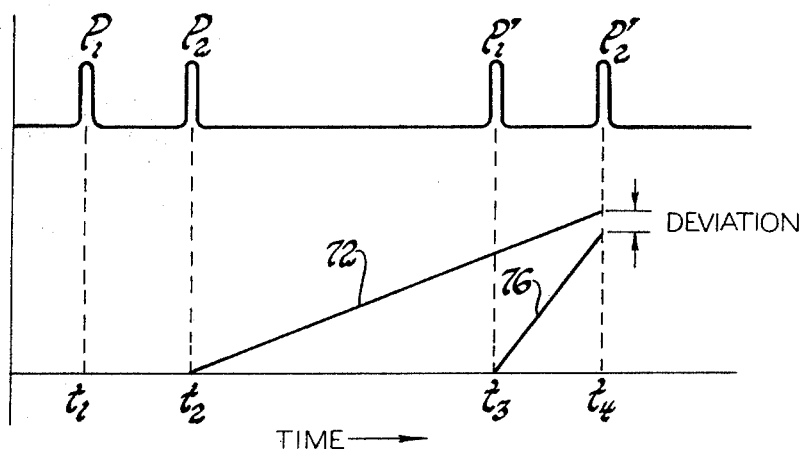

As shown in FIG. 2, with the knowledge of the approximate landing velocity V of the aircraft 10, the Doppler shift frequencies which are passed by the filter circuit 42 may be tuned such that these frequencies occur at the points A and B of FIG. 1 wherein the angle $\theta$ is approximately 45°. As shown in FIG. 5, a first pulse $p_1$ is produced as the aircraft 10 passes through the point A and a second pulse $p_2$ is produced as the aircraft 10 passes through the point B. The filter 42 may include pulse forming and sharpening circuitry if necessary. The pulses $p_1$ and $p_2$ are applied to an indicator circuit 44 along with an aircraft velocity signal from a source 46 to perform the simple mathematical calculation necessary to derive the value of the altitude $h$ from the elapsed time T between the pulses $p_1$ and $p_2$ and the aircraft velocity V. The mathematical calculation satisfies the equation $h = VT/2$ for the case $\theta = 45°$.

In summary, the method for calculating the altitude $h$ of the aircraft 10 relative to the transmitting antenna 14 as implemented by the apparatus of FIGS. 1 and 2 comprises the following steps: (a) transmitting a signal at frequency $f_1$ from the effective point source defined by ground based antenna 14, (b) receiving the $f_1$ signal in the aircraft 10 by means of the antenna 28, (c) mixing the $f_1$ signal with the reference signal derived from the signal at frequency $f_0$ received by way of antenna 30 to determine the Doppler frequency shift in the received signal due to the relative movement between the aircraft 10 and the transmitting antenna 14, (d) generating a first pulse $p_1$ as the aircraft 10 passes through the point A such that the Doppler frequency shift equals a predetermined first quantity due to relative convergence between the aircraft 10 and the antenna 14, (e) generating a second pulse $p_2$ as the aircraft 10 passes through point B at which time the Doppler frequency shift again equals the first quantity due to relative divergence between the aircraft 10 and the antenna 14 and (f) determining the altitude $h$ as a function of the elapsed time T between the production of the pulses $p_1$ and $p_2$ and the aircraft velocity V.

It will be apparent to those skilled in the art that the apparatus of FIGS. 1 and 2 may be reversed in position or location to the extent that the altitude calculating apparatus is ground based rather than disposed in the aircraft 10. In such an arrangement, the aircraft 10 might simply carry a frequency generating transponder and the Doppler frequency responsive receiver would be disposed at the ground reference level 22.

Figure 3:
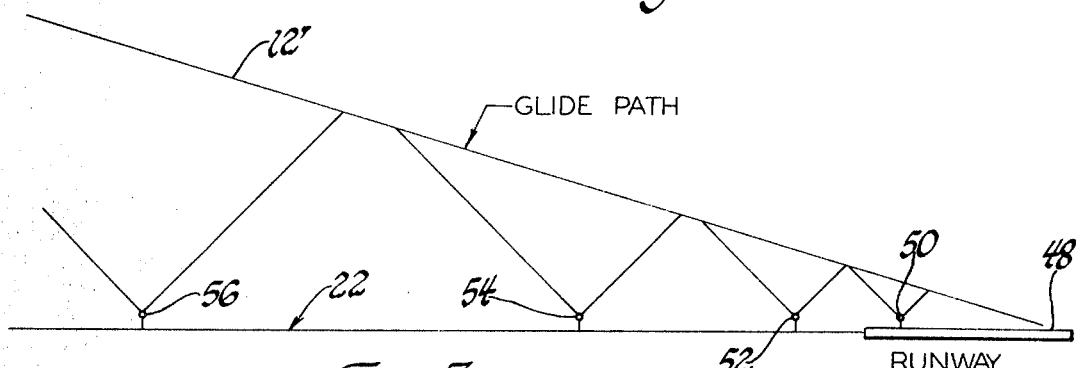
FIG. 3 is an altitude profile of a glide path equipped in accordance with the embodiment to the invention.

FIG. 3 illustrates a typical installation for guiding the aircraft 10 along a descent glide path 12' having a predetermined altitude profile calculated to direct the aircraft 10 toward a successful touchdown on the runway 48. The installation of FIG. 3 includes a plurality of transmitting stations 50, 52, 54, and 56 spaced along a ground reference line which is aligned with the runway 48. The stations are located at progressively increasing distances apart with increasing distance from the end of the runway 48 and each is equipped with a suitable antenna. Each of the transmitting stations 50, 52, 54, and 56 is connected to a source of signals at a frequency $f_1$ as indicated in FIG. 1 to radiate a continuous wave signal at a frequency $f_1$ as previously described with reference to FIG. 1. Accordingly, the receiver apparatus disposed in the aircraft 10 produces a pulse pair in response to each of the signals from the stations 50, 52, 54, and 56 and the altitude $h$ of the aircraft 10 is determined with respect to each of the stations. Accordingly, a knowlege of the placement of the stations 50, 52, 54, and 56 relative to the desired touchdown point permits the pilot of the aircraft 10 to continuously compare actual altitude to the preferred altitude at each of a plurality of distances from the eventual touchdown point. It is apparent that the equal Doppler shift points for each station will be equally spaced about a line perpendicular to the glide path rather than a true vertical. Any spacing of the transmitting stations may be provided but, as a general rule, closer antenna spacing is desirable as the aircraft 10 approaches the touchdown point. It will be understood that although FIG. 3 shows the stations 50, 52, 54, and 56 disposed in a common horizontal plane, the contour of the terrain near the runway 48 may be such that it is impractical to construct towers or artificial supports for the stations to place them in the same horizontal plane. Under these conditions a simple adjustment in the altitude program may be made in order to maintain the aircraft 10 on the desired glide path 12. It is to be understood that the system of FIG. 3 incorporates all of the features previously described with reference to FIGS. 1 and 2.

Figure 4:
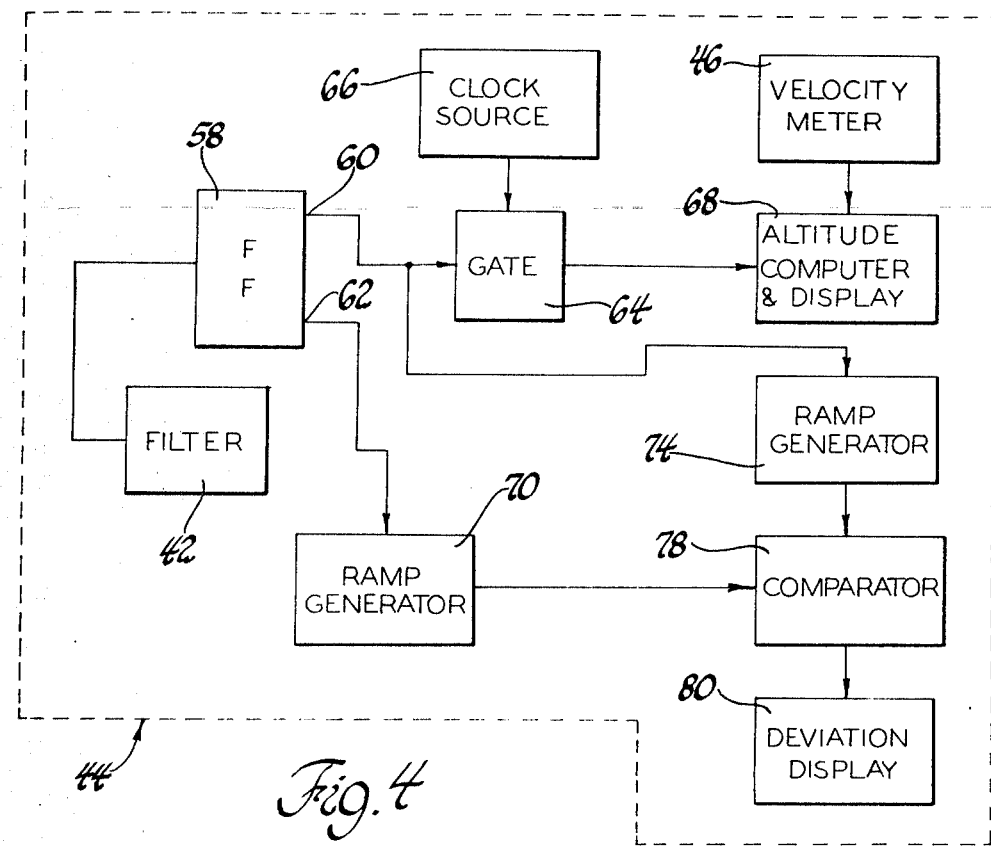
FIG. 4 is a block diagram of an aircraft receiver apparatus for determining altitude deviation, and, FIG. 5 is a wave form diagram for the apparatus of FIG. 4.

FIG. 4 illustrates a preferred implementation of the indicator circuit 44 of FIG. 2 which provides information regarding the deviation between the actual and preferred altitudes of the aircraft 10 at the various points along the glide path 12'. In FIG. 4 the output of the filter circuit 42 is connected to the input of a bistable logic circuit 58, such as a flip-flop, having complementary output terminals 60 and 62. Circuit 58 responds to pulse inputs from the filter 42 to alternately energize the outputs 60 and 62. Output 60 is connected to the control terminal of a gate circuit 64 which controls the transmission of fixed frequency clock signals from a source 66 to an altitude computer ad display unit 68. The computer and display unit 68 also obtains velocity information from the source 46 and provides an output indication of the altitude $h$ of the aircraft 10 relative to the particular transmitting station which causes filter 42 to produce a pair of output pulses.

Specifically, the first pulse $p_1$ in the pulse pair causes the bistable logic circuit 58 to activate output 60 which in turn enables gate 64 to pass clock pulses from the source 66 to the computer 68. The second pulse $p_2$ from the filter 42 deactivates output 60 and activates output 62 thereby closing the gate circuit 64 and terminating the transmission of clock pulses to the computer unit 68. The computer unit 68 may include a simple digital counter circuit which indicates altitude $h$ as a function of the number of digital pulses counted, together with a digital to analog converter which permits the time to count to be weighted by the velocity signal from source 46.

The output 62 of bistable logic circuit 58 is connected to the input of a first ramp generator 70 which produces a ramp voltage; i.e., a voltage which increases linearly in amplitude with time. The ramp generator 70 initiates a new ramp signal 72 shown in FIG. 5 upon each occurrence of an input pulse applied thereto from the output channel 62 of the bistable logic circuit 58. The slope of the ramp voltage 72 is related to the spacing between adjacent stations, for example, between the transmitting stations 54 and 52 of FIG. 3.

The first pulse output 60 of bistable logic circuit 58 is connected to a second ramp generator 74 which produces a second time varying ramp voltage 76 identified in FIG. 5. This ramp voltage 76 has a slope or time rate of increase which is inversely proportional to the ratio between the desired altitude at the second of the two succeeding transmitting stations, that is, relative to station 52 in the diagram of FIG. 3, and the distance between the two succeeding stations. The outputs of the two ramp generators 70 and 72 are connected to separate inputs of a voltage comparator circuit 78 which functions to produce an output signal related to the amplitude difference in the two input signals. This output is applied to a deviation display unit 80 for the purpose of indicating the actual deviation between the desired and actual altitude of the aircraft 10 relative to the second of the two succeeding transmitter stations, that is, transmitter 52 in the example given. Display units 68 and 80 may be constructed to provide a combined visual indication of altitude and deviation.

More specifically, if the desired glide path 12' of FIG. 3 passes through an altitude $h$ relative to the transmitter antenna 52 and the preceding transmitter station 54 is $8h$ feet away from the station 52 then the slope of the ramp voltage 72 is set at ⅛ that of the ramp voltage 76. Accordingly, the comparator 78 functions to compare the time separation of the pulses $p_1'$ $p_2'$ over the transmitter station 52 with ⅛ of the time lapse since the pulse $p_2$ of the last pulse pair. Obviously, the slope factors will be varied in accordance with the actual spacing between the two succeeding transmitting stations selected.

As an example of an alternative to the arrangement of FIG. 1, the spaced points may be defined by two ground based transmitters or receivers which transmit or receive, respectively, continuous signals to or from an aircraft. In this arrangement, the Doppler frequency shifts measured determine the angles between the signal paths and the ground plane. With these angles and the known spacing between the transmitter points, the altitude is readily calculated.

It is to be understood that the embodiments described in the foregoing text are merely illustrative of the invention and are not to be construed in a limiting sense. For a definition of the invention, reference should be had to the appended claims.

What is claimed is:

1. A method for determining the altitude of an aircraft moving at a known rate relative to a reference point along a path which is spaced from the reference point comprising the steps of: transmitting a signal at a predetermined frequency from the reference point to the aircraft, receiving the signal in the aircraft and determining the Doppler frequency shift therein, generating a first pulse when the Doppler frequency equals a first quantity due to relative convergence of the aircraft and the reference point, generating a second pulse when the Doppler frequency shift again equals the first quantity due to relative divergence of the aircraft and the reference point, and determining the average altitude between the aircraft and the reference point between the first and second pulses as a function of the time elapsed between said pulses and the known rate of the aircraft.

2. A method for determining the deviation of the altitude of an aircraft from a desired altitude relative to one of a plurality of ground reference points which are spaced from the flight path of the aircraft comprising the steps of: transmitting signals at predetermined frequencies from each of the reference points to the aircraft, receiving the signals in the aircraft and determining the Doppler frequency shifts therein, generating first and second pulses when the Doppler frequency shift in the signal from a first point equals a predetermined quantity due to relative convergence and divergence, respectively, of the aircraft and the first point, generating third and fourth pulses when the Doppler frequency shift in the signal from a second succeeding point equals a predetermined quantity due to relative convergence and divergence, respectively, of the aircraft and the second point, generating a first time-increasing signal beginning with the occurrence of the second pulse and increasing at a rate related to the distance between the first and second points, generating a second time-increasing signal beginning with the occurrence of the third pulse and increasing at a rate related to the desired altitude of the aircraft relative to the second point, and comparing the first and second time-increasing signals at the occurrence of the fourth pulse to produce a difference quantity representing the deviation.

3. Apparatus for determining the altitude of an aircraft moving along a flight path at a known rate relative to a ground reference plane comprising: a transmitter located at a first point in the reference plane for producing a signal of predetermined frequency, a receiver located in the aircraft for receiving the signal, first means connected to the receiver for producing a first signal quantity related to the Doppler shift in the predetermined frequency, second means connected to the first means for producing a second signal quantity when the output signal equals a predetermined quantity, output means connected to the second means for determining the altitude as a function of the elapsed time between the occurrence of a first signal quantity due to relative convergence of the aircraft and the transmitter and a second signal quantity due to relative divergence of the aircraft and the transmitter, and a second transmitter located at a second point along a line corresponding to the projection of the flight path and spaced from the first mentioned transmitter, the second transmitter producing a signal at a reference frequency distinct from the predetermined frequency, the first means including means for receiving the signal from the second transmitter, means for converting the reference frequency to a third frequency nominally equal to the predetermined frequency, and means for comparing the third frequency to the frequency at which the predetermined frequency signal is received for determining the Doppler shift.

4. Apparatus as defined in claim 3 including computer means for determining the deviation between the actual altitude relative to one of the transmitters and a desired altitude comprising a first generator connected to the second means for producing a first time-varying signal in response to the second signal quantity produced with reference to the first transmitter point and of a character which varies at a rate related to the distance between the first and second transmitter points, a second generator connected to the first means for producing a second time-varying signal in response to the first signal quantity produced with reference to the second transmitter point and of a character which varies at a rate related to the rate of variation of the first time-varying signal multiplied by the ratio of the distance between the first and second transmitter points and the desired altitude relative to the second transmitter point, and comparator means connected to receive the first and second time-varying signals for producing an error signal related to the difference therebetween at the occurrence of the second signal quantity produced with reference to the second transmitter point.

* * * * *